(12) United States Patent
Bonney et al.

(10) Patent No.: US 11,196,157 B1
(45) Date of Patent: Dec. 7, 2021

(54) OPTIMIZING JOINT AERIAL-LAYER NETWORKS USING STEERABLE ANTENNAS

(71) Applicant: ARCHITECTURE TECHNOLOGY CORPORATION, Eden Prairie, MN (US)

(72) Inventors: Jordan Bonney, Eden Prairie, MN (US); Barry Trent, Eden Prairie, MN (US)

(73) Assignee: ARCHITECTURE TECHNOLOGY CORPORATION, Eden Prairie, MN (US)

(*) Notice: Subject to any disclaimer, the term of this patent is extended or adjusted under 35 U.S.C. 154(b) by 0 days.

(21) Appl. No.: 16/887,175

(22) Filed: May 29, 2020

(51) Int. Cl.
| | |
|---|---|
| *H01Q 3/00* | (2006.01) |
| *H04B 7/185* | (2006.01) |
| *G01C 21/20* | (2006.01) |
| *G05D 1/10* | (2006.01) |
| *G05D 1/00* | (2006.01) |
| *H04W 84/06* | (2009.01) |

(52) U.S. Cl.
CPC ............. *H01Q 3/005* (2013.01); *G01C 21/20* (2013.01); *G05D 1/0022* (2013.01); *G05D 1/101* (2013.01); *H04B 7/1851* (2013.01); *H04B 7/18506* (2013.01); *H04W 84/06* (2013.01)

(58) Field of Classification Search
CPC ...... H01Q 3/005; G01C 21/20; G05D 1/0022; G05D 1/101; H04B 7/18506; H04B 7/1851; H04W 84/06
See application file for complete search history.

(56) References Cited

U.S. PATENT DOCUMENTS

| | | | |
|---|---|---|---|
| 9,537,561 B1* | 1/2017 | Kotecha | H04W 8/00 |
| 9,685,088 B2 | 6/2017 | Trent et al. | |
| 2001/0038342 A1* | 11/2001 | Foote | G08C 17/02 |
| | | | 340/870.02 |
| 2014/0292578 A1* | 10/2014 | Ibrahim | H01Q 1/1257 |
| | | | 342/368 |

(Continued)

OTHER PUBLICATIONS

Architecture Technology Corporation, Topic: N192-070, Proposal #192-070-0718, Jul. 1, 2019.

*Primary Examiner* — Dinh Nguyen
(74) *Attorney, Agent, or Firm* — Foley & Lardner LLP

(57) ABSTRACT

A communication optimization system/method for mobile networks uses a server that generates waypoints based on a first communication network within a route to be travelled by an aerial vehicle, the aerial vehicle comprising a communication hub configured to communicate with at least one communication node, a communication hub controller configured control movement of a steerable antenna, and an aerial vehicle controller configured control movement of the aerial vehicle. The server then transmits the waypoints to the aerial vehicle controller; periodically monitors networks not connected to the communication hub; when a second communication network not connected to the communication hub satisfies a threshold, transmits causes the communication controller to steer the steerable antenna in a direction of the second communication network, further causing the communication hub to communicate and connect with the second communication network.

20 Claims, 10 Drawing Sheets

(56) References Cited

U.S. PATENT DOCUMENTS

2015/0236778 A1\* 8/2015 Jalali .................... H04W 84/06
370/316
2016/0300494 A1\* 10/2016 Trent ................... G05D 1/0022
2021/0067239 A1\* 3/2021 Babich ............... H04B 7/18504

\* cited by examiner

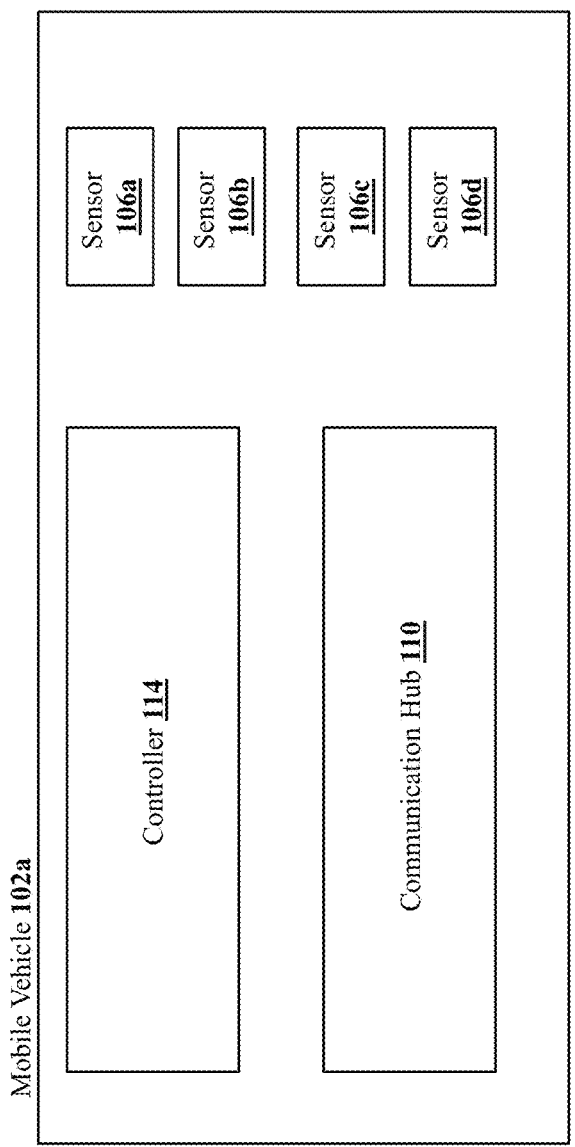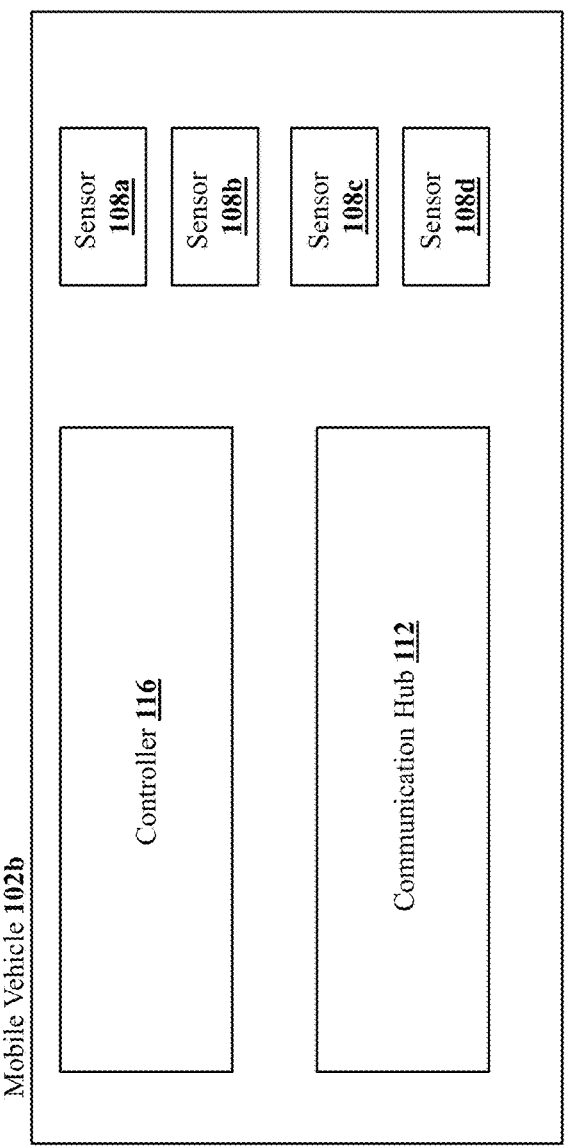

OPTIMIZING JOINT AERIAL-LAYER NETWORKS USING STEERABLE ANTENNAS

TECHNICAL FIELD

This application relates generally to the field of aerial networks, and more specifically to systems and methods for allowing mobile vehicles to provide networks.

BACKGROUND

Airborne communications systems, such as joint layered area networks (JALNs) have been developed to enable communications between electronic/communication devices in remote locations not having a communication infrastructure. In implementing airborne communication systems, a flight path/orbit is generated for a mobile vehicle (e.g., aerial vehicle) that houses an airborne communication hub. The flight plan includes waypoints for the aerial vehicle to pass through to position the communication hub in desired locations to enable communication links between the communication hub and communication subscriber nodes (nodes or communication nodes).

In creating a flight path/orbit for the aerial vehicle, a mission planner combines his/her experience with information that includes the location of communication subscriber nodes and the knowledge of the aerial platform and the type of terrain. This approach, however, is fraught with difficulty. As the number of communication subscriber nodes, their respective mission priorities and communication requirements increase, the planner is presented with a combinatorial explosion of interacting variables that need to be considered in creating the flight path/orbit.

Conventional software solutions have solved the above-described problem by providing computer-generated results that optimize the aerial vehicle's flight paths/orbits. The computer-generated flight paths can sometimes be dynamically revised based on the ever-changing mission conditions. However, conventional software solutions suffer from a technical shortcoming. For instance, conventional software solutions may only focus on revising flight paths and may not consider changing network conditions. Therefore, while an aerial vehicle may change its path to optimize connectivity, the aerial vehicle may not consider connecting/disconnecting from different JALNs. Therefore, conventional methods may optimize connectivity by changing the flight path, which may be an expensive and time-consuming solution.

SUMMARY

What is therefore desired are communication techniques that inherently enable the simultaneous use of multiple communication protocols in conjunction with altering a predetermined flight path. The methods and systems described herein may optimize connectivity by continuously monitoring network conditions and dynamically changing network connectivity. For instance, an aerial vehicle may be equipped with steerable antennas and in communication with a mission control server. The mission control server may continuously monitor JALN attributes associated with the aerial vehicle. When the mission control server determines that connecting to a new network (and disconnecting from a network that was part of the original flight plan) improves connectivity, the mission control server may control the steerable antenna, connect to the new network, and disconnect from the original network to improve connectivity.

In an embodiment, an electronic system for an aerial vehicle configured to connect a plurality of communication nodes comprises a communication hub configured to communicate with at least one communication node within the plurality of communication nodes using a steerable antenna; and a communication hub controller configured control one or more movement attributes of the steerable antenna; an aerial vehicle controller configured control one or more movement attributes of the aerial vehicle; and a server in communication with the aerial vehicle, the server configured to: in response to receiving an indication of at least one communication node, generate a plurality of waypoints based on a first communication network within a route to be travelled by the aerial vehicle; transmit the waypoints to the aerial vehicle controller; periodically monitor one or more networks not connected to the communication hub; when a second communication network not connected to the communication hub satisfies a threshold, transmit an instruction to the communication hub controller, the instruction causing the communication controller to steer the steerable antenna in a direction of the second communication network, the instruction further causing the communication hub to communicate and connect with the second communication network.

In another embodiment, a method comprises in response to receiving an indication of at least one communication node, generating, by a server, a plurality of waypoints based on a first communication network within a route to be travelled by an aerial vehicle, the aerial vehicle comprising: a communication hub configured to communicate with at least one communication node within the plurality of comunication nodes using a steerable antenna; and a communication hub controller configured control movement of the steerable antenna; and an aerial vehicle controller configured control movement of the aerial vehicle; transmitting, by the server, the waypoints to the aerial vehicle controller of the aerial vehicle; periodically monitoring, by the server, one or more networks not connected to the communication hub; when a second communication network not connected to the communication hub satisfies a threshold, transmitting, by the server, an instruction to the communication hub controller, the instruction causing the communication controller to steer the steerable antenna in a direction of the second communication network, the instruction further causing the communication hub to communicate and connect with the second communication network.

Embodiments disclosed herein solve the aforementioned technological problems and/or other technological problems. The systems and methods of the disclosure are capable of independently optimizing multiple information flows between different networks. The disclosed systems and methods redistribute traffic for optimal link utilization.

BRIEF DESCRIPTION OF THE DRAWINGS

The accompanying drawings constitute a part of this specification and illustrate embodiments of the subject matter disclosed herein.

FIGS. 1B-C illustrate components of mobile vehicles within the communication travel plan generation system, in accordance with an embodiment.

DETAILED DESCRIPTION

Figure 1A:
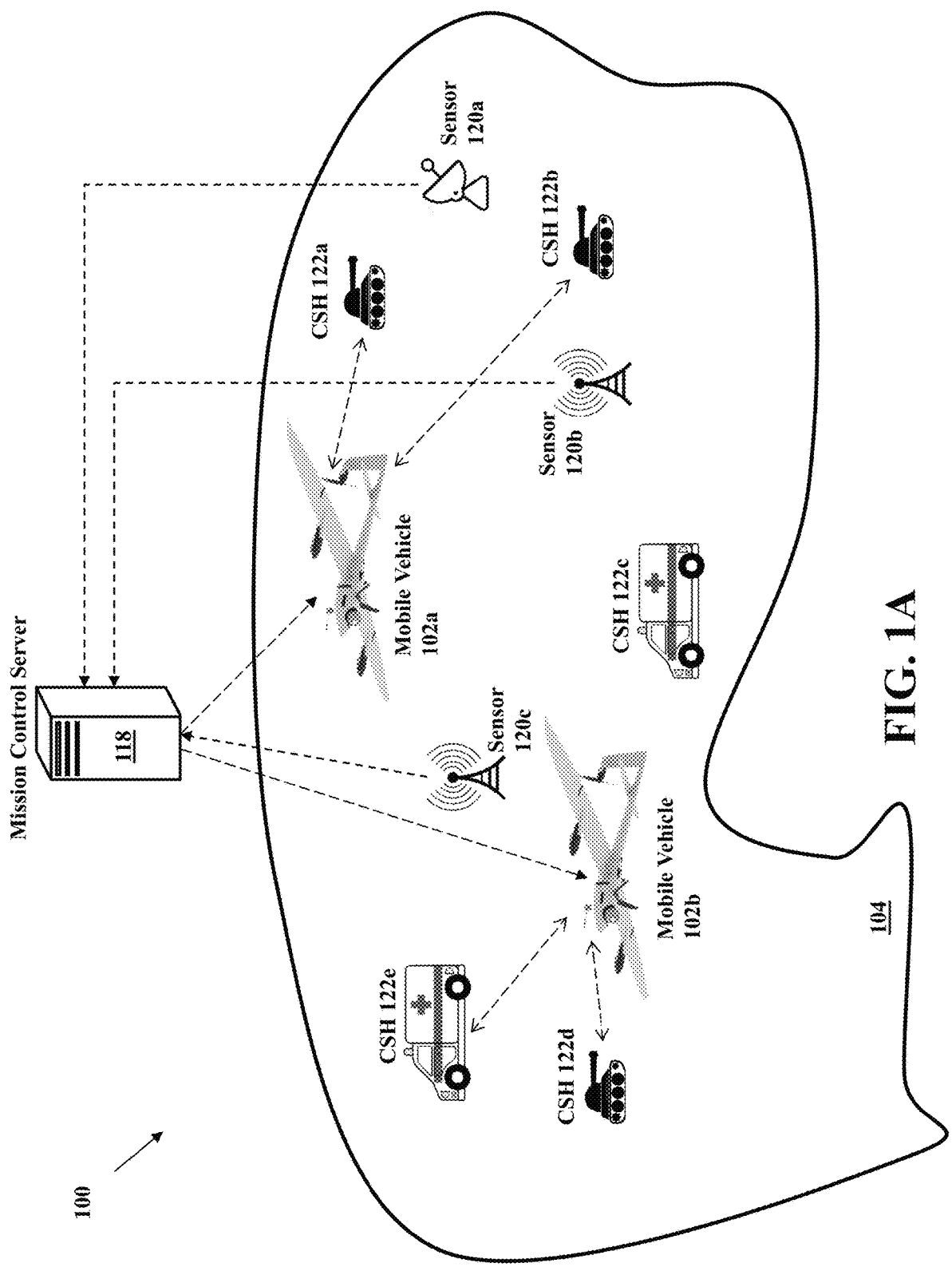
FIG. 1A illustrates a communication system that implements a communication travel plan generation system, in accordance with an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein.

Rather than having one or more mission planners enter waypoints manually into a flight planning system (or mission planning system), embodiments disclosed herein implement a communication travel plan generation system. The communication travel plan generation system is generally a mission planning system. Embodiments support both fully automatic and human assisted mission planning. The communication travel plan generation system computes travel waypoints automatically based on mission-specific information. The communication travel plan generation system also continuously monitors network attributes and conditions. Therefore, the communication travel plan generation system may also dynamically revise network connectivity of one or more aerial vehicles, such that the aerial vehicles provide better network connection to various subscriber nodes.

FIG. 1A illustrates a communication system 100 that implements embodiments of the communication optimization system described herein. In the depicted embodiment, a mobile vehicle 102a traverses about travel area 104. The mobile vehicle 102a may be configured to provide network to various electronic devices within the travel area 104. In some embodiments, the mobile vehicle 102a may work with one or more other mobile vehicles to provide network connectivity to various electronic devices within the travel area 104. For instance, the mobile vehicle 102a may work in conjunction with the mobile vehicle 102b. The mobile vehicles 102a and/or 102b may be an aerial vehicles (e.g., airplane or drone) or any other mobile vehicle (e.g., car). As depicted in FIGS. 1B-C, each mobile vehicle may include sensors 106a-d (collectively sensors 106) or sensors 108a-d (collectively sensors 108), communication hubs 110 and 112, and the controllers 114 and 116.

The mobile vehicles 102a-b may utilize the communication hubs 110 and 112 to communicate with the mission control server 118. The mission control server 118 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single mission control server 118, in some configurations, the mission control server 118 may include any number of computing devices operating in a distributed computing environment.

In operation, the mission control server 118 may generate a travel plan for the mobile vehicles 102a and/or 102b, such that these mobile vehicles provide network connectivity to one or more electronic devices within the travel area 104. As will be described below, the mission control server 118 may also communicate with various sensors within the travel area 104 and dynamically revise the travel plan of the mobile vehicles 102a and/or 102b. The mission control server 118 may also use the data received from the sensors to control the functionality of the mobile vehicles 102a and/or 102b. For instance, when the mission control server 118 determines that at least one of the mobile vehicles 102a and/or 102b can optimize the network connectivity using a different network protocol or by connecting to a different network, the mission control server 118 may communicate with the controller 114 and/or the controller 116 and modify the travel plan. Specifically, the mission control server 118 identify better networks for the mobile vehicles 102a and/or 102b to connect using sensors 106/108 and/or other sensors within the travel area 104.

The travel area 104 may also include a plurality of spaced communication subscriber hubs 122a-122e (collectively CSH 122 or sometimes referred to as communication nodes or nodes). The CSH 122 may communicate with the communication hub 110 of the mobile vehicle 102a as the mobile vehicle 102a traverses throughout the travel area 104 during a mission. The communication travel plan generation system 100 may automatically generate travel waypoints for the mobile vehicle 102a and/or 102b with at least one controller 114 and/or 116. The generation of the travel waypoints is based on the location of the CSH 122 and mission-specific information as described in detail below.

In an embodiment, more than one mobile vehicles with a communication hub is used in the communication system 100. As illustrated, the communication system 100 is shown as also including mobile vehicle 102b. The communication travel plan generation system 100 is also configured to coordinate the paths of both mobile vehicles 102a and 102b. Moreover, more than two vehicles could be implemented in a similar manner in a communication system.

The system 100 also illustrates an embodiment with a mission control server 118 that is in communication with the mobile vehicles 102a and 102b. The mission control server 118 may provide mission-specific information to the respective mobile vehicles 102a and 102b. The mission control server 118 may be in communication with sensors 120a, 120b, and 120c (collectively sensors 120). The sensors 120 may provide mission-specific information to the mission control server 118. The mission-specific information may be information related to surveillance of variance conditions within the travel area 104. The mission control server 118 may communicate the sensed mission-specific information to the mobile vehicles 102*a* and 102*b*. The sensor generated mission-specific information may be used in an embodiment to dynamically change the travel path (or other functionality) of one or more of the mobile vehicles 102*a* and/or 102*b* as further discussed in detail below. In some embodiments, the mission control server 118 may receive the above-described information from the sensors 106/108.

The sensors 120 may include, but are not limited to, radar sensors, camera sensors, thermal imaging sensors, etc. In one embodiment, sensors 120 may be implemented within the mobile vehicles 102*a* and/or 102*b* themselves and/or within the CSH 122. This embodiment provides a system that allows the mobile vehicle 102*a* and/or 102*b* to dynamically update the travel path or connection plan autonomously.

Although, the communication travel plan generation system 100 can be applied to any type of communication system that implements a mobile vehicle with a communication hub, it has particular applicability to aerial vehicles. One aerial vehicle application is for military use where an aerial platform with a communication hub is needed to provide communication links to subscriber communication nodes on land, air, and sea. The mission-specific information for this type of application may include the types of subscriber communication nodes to be used, the capabilities of the aerial platform itself, and a host of other potential data such as terrain, weather, relative priority of the various subscriber nodes and surveillance information. The mission-specific information needed in the communication system 100 may include the type of and capabilities of the CSH 122 that need to communicate with the communication hub 110 of the mobile vehicle 102*a* and 102*b*.

Regarding military applications, despite efforts to standardize, a wide variety of military radios exist with varying capabilities and functions. Some older radios may only provide voice communications, or support legacy data communication approaches, such as Link-16. Newer radio systems typically support IP-based network communications, and may even use IP protocols to support other important functions, such as Voice over IP, file transfers, email, etc. It is desirable for the communication travel plan generation system 100 to be able to accommodate this wide variety of radios and capabilities. Even for a particular instance of radio hardware it is quite possible that different radio waveforms with different capabilities and functions are supported. For example, Harris's PRC-152A and PRC-117G radios are capable of operating using either the ANW2 or the SRW waveform, and can even switch back and forth between these two modes of operation with the simple flip of a switch.

In addition, an aerial platform typically incorporates a mix of different radio types, potentially including both legacy and IP-based radios. The capabilities of an aerial platform therefore are, at a minimum, the sum of the collection of the radios it includes. Finally, different radios and platforms may be available in different configurations. For example, different antenna configurations or the presence of external power amplifiers can radically alter the performance characteristics of radios. Mission-specific radio planning parameters are also an issue where, for instance, a total bandwidth of 1 Mbps might be evenly divided amongst the expected number of radio elements. A 2-radio network might be set for 500 Kbps per radio, whereas a 10-radio configuration might be set for 100 Kbps per radio. An automated planning system preferably is capable of accepting a wide variety of input data about a diverse set of radios, platforms, and their configurations. Moreover, a truly advanced planning system of an embodiment incorporates planning elements, which actually define the configuration of the radios themselves and even suggest, for example, desired antenna or power amplifier configurations.

Figure 2:
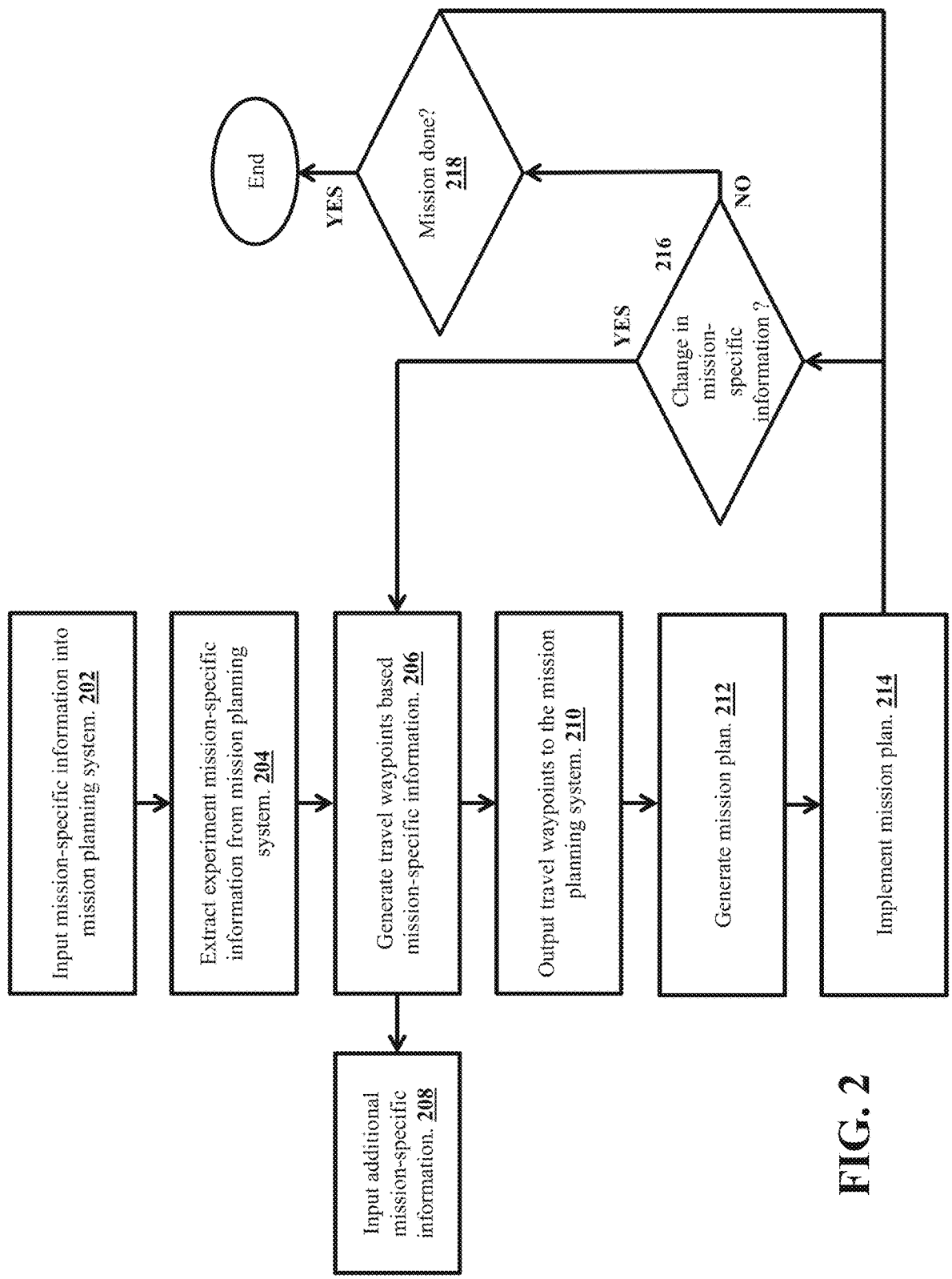
FIG. 2 is a block diagram of a communication travel plan generation system, in accordance with an embodiment.

FIG. 2 illustrates a travel generation flow diagram 200, in accordance with an embodiment. The method 200 describes various steps in implementing and applying a mission plan for a mobile vehicle (e.g., the mobile vehicle 102*a* and/or 102*b* discussed in FIG. 1A).

The method 200 includes steps 200-218. However, other embodiments may include additional or alternative execution steps, or may omit one or more steps (or any part of the steps) altogether. The method 200 is described as being executed by a server, similar to the mission control server described in FIG. 1A. However, one or more steps of method 200 may also be executed by any number of computing devices operating in the distributed computing system described herein.

Even though some aspects of the embodiments described herein are described within the context of proving network connectivity during a mission, it is expressly understood that methods and systems described herein apply to all JALNs and generally to all networks provided using mobile vehicles.

The process starts by inputting mission-specific information into a mission planning system of the vehicle at step 202. The mission-specific information would include the location of the communication subscriber nodes. Other mission-specific information is described in detail below. Pertinent mission-specific information is then extracted from the mission planning system at step 204. The pertinent mission-specific information may be used to generate travel waypoints at step 206. In one embodiment, all of the mission-specific information needed to generate the travel waypoints are extracted from the mission planning system.

In another embodiment, the communication travel plan generation system receives at least some of the mission-specific information from another source, such as, but not limited to, mission control described in FIG. 1A, an input to the communication travel plan generation system used during pre-planning, and sensors (e.g., sensors 120 in FIG. 1A) at step (208). As described in detail below, the communication travel plan generation system implements a geographical simulation in generating the travel waypoints.

Once the travel waypoints have been generated, they are output to the mission planning system of the mobile vehicle at step 210. The mission planning system then may use the waypoints to generate a mission plan at step 212. The mission plan is to implement at step 214. The mobile vehicle then traverses the travel area and communicates with communication subscriber nodes. The controller of the mobile vehicle may monitor for changes in the mission-specific information step 216. If no changes to the mission-specific information is detected at step 216, it is then determined if the mission is complete at step 218. If the mission is complete at step 218, the process ends. If the mission is not complete at step 218, the controller of the mobile vehicle continues to monitor for changes in the mission-specific information at step 218. If the controller does detect changes in the information-specific information at step 218, a new set of path waypoints are generated at step 206 and the process continues as shown. Hence, this embodiment illustrates a system that dynamically changes the mission plan as the mission-specific information changes.

The operation of mobile airborne and air/surface networks and radios is a highly dynamic proposition. Hence, having the ability to dynamically adjust the mission plan during a mission based on changing situations is highly desirable in some situations. While traditional "forward" flight planning can be used to direct an airborne communications platform to its intended mission area and back to its base, the flight behavior it exhibits while actually "loitering" over a battle space or following communication subscribers have a major impact on critical parameters such as network bandwidth, coverage footprint, and radio range. For many Internet Protocol (IP) and data-oriented radio networks bandwidth, for example, may vary widely depending on distance and other factors.

Entry and exit of elements into and out of the battlespace are also factors that may not always be easily predictable. To the extent that the motion of supported elements and entry/exit times are known ahead of time pre-planning may be done, but the real strength of an advanced system of embodiments is to allow for dynamic re-planning in the face of changing conditions during the actual mission. Other dynamic mission-specific information may include terrain, weather effects, antenna orientation during flight maneuvers, surveillance information and constraints based on known or suspected positions of enemy elements are also capable of changing rapidly and effecting mission performance.

As deployment of airborne communication platforms grows, it is expected that multiple airborne platforms, as discussed above in regards to FIG. 1A, are used in support of a single mission. The ability to plan and control these multiple platforms in a coordinated way may be important. For example, multiple platforms might form a mesh network amongst themselves while still supporting communication subscribers, permitting a pre-planned (or dynamically managed) hand-off of support from one platform to another and advanced routing between airborne platforms. This type of advanced capability could be used to support connectivity both within the battle space and to other elements located remotely or otherwise outside of the battle space proper. The ability to balance the communication and connectivity requirements of diverse elements in a mission and to ensure that all requirements are met as well as possible in the face of dynamically changing network and battle space conditions is a challenge for any advanced mission planning system.

In an embodiment, a mission planner simply enters the location of the communication subscriber nodes, along with the mission-specific information described above such as mission priorities and the types of subscriber communication nodes in use into an existing mission planning system. The communication travel plan generation system pulls this information from the mission planning system and uses the platform, terrain, radio, and other information available to it to automatically generate a set of travel waypoints which are inserted back into the mission planning system. With this system, mission planning personnel are no longer required to have multi-disciplinary expertise and a wealth of experience to plan the flight path. The communication travel plan generation system performs the complex tasks and shields mission planning personnel from all the inherent complexity of the problem.

This approach can more effectively utilize the resources of the dedicated aerial platform, maximizing radio connectivity for subscribers as required for the mission. Moreover, in an embodiment, the communication travel plan generation system not only analyzes the given mission information and generates the flight path, it also predicts when and how much coverage can be expected by each communication subscriber node. This can be critically important for communication subscriber nodes, allowing them to budget and extend the battery life of radios and also know when to expect connectivity during the course of their missions. As discussed above, in one embodiment, the communication travel plan generation system is configured to dynamically adjust the flight path based on changes in the mission information. This dynamic communication travel plan generation system can be referred to a Dynamic Airborne Mission Communication System (DYNAMICS), which is fully described in U.S. Pat. No. 9,685,088, filed Apr. 8, 2016, which is incorporated herein by reference in its entirety.

Figure 3:
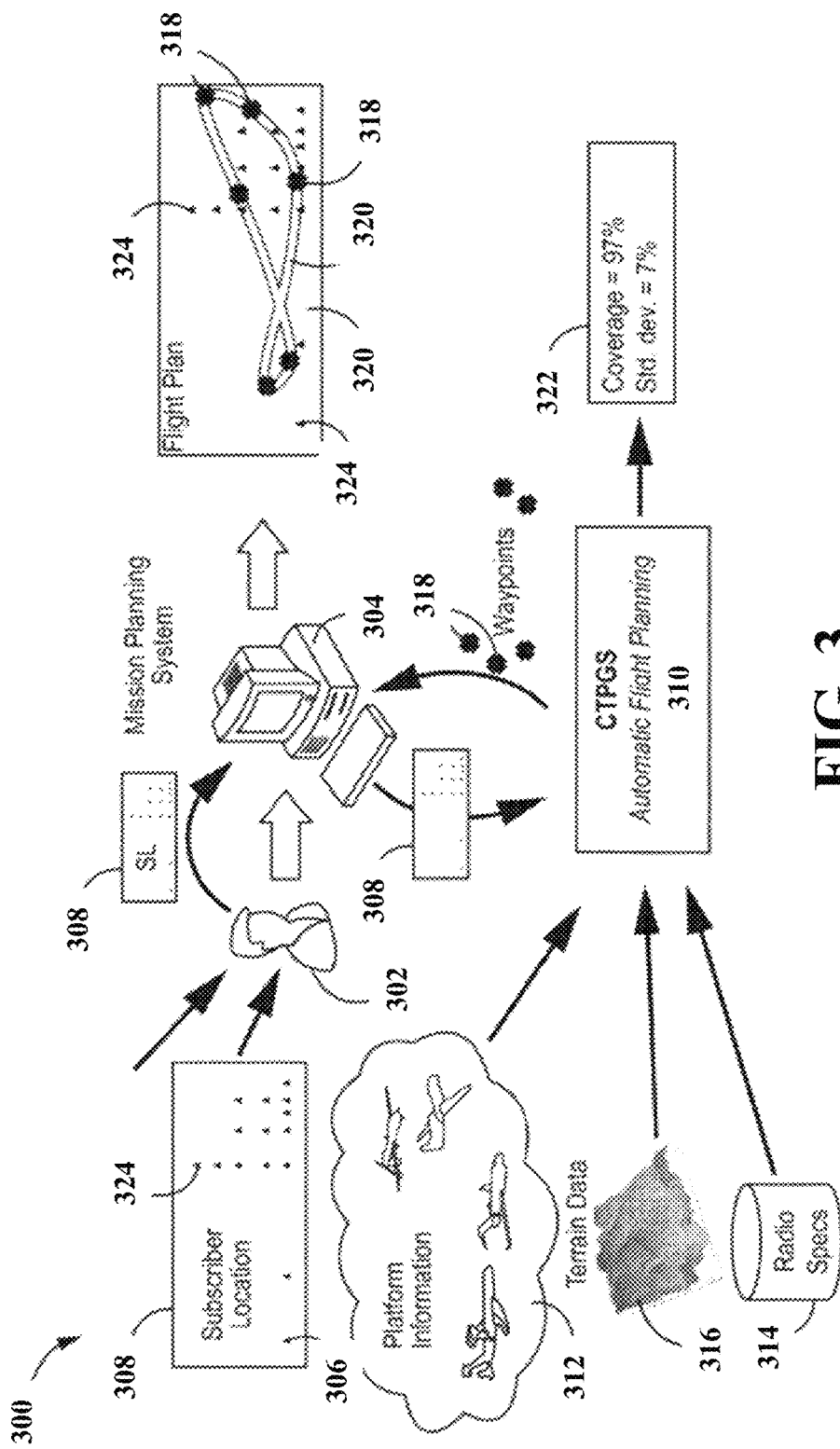
FIG. 3 is an illustration communication travel plan generation system, in accordance with an embodiment.

A generalized overall illustration of a flight planning and communication system 300 of an embodiment is illustrated in FIG. 3. The mission planner 302 in this embodiment enters into the mission planning system 304 the location of each communication subscriber node 306 that is to be communicated with during a mission. The locations of each communication subscriber node 306 are shown, for illustration purposes in FIG. 3, as a subscriber location map 308 that illustrated different nodes 324. In this embodiment, the mission planning system 304 passes the communication subscriber location map 308 to the communication travel plan generation system 310 for processing.

The communication travel plan generation system takes this information, along with other mission-specific information that may include platform information 312, terrain information 316, and radio specification information of the communication subscriber nodes (radio specs 314), mission priorities information, and other available information to automatically generate a set of travel waypoints 318, which is communicated back into the mission planning system 304. The mission planning system 304 then, based on the relieved waypoints from the communication travel plan generation system 310 sets out the flight path 320. As discussed above, although the platform information 312 is illustrated as including aerial vehicles, embodiments can be employed on other types of mobile vehicles that include a communication hub that is to be in communication with a plurality of communication subscriber nodes. Hence, the mission planning system 304 may provide a travel path instead of a flight path. Further, in embodiments, communication travel plan generation system 310 analyzes the scenario and the flight path to predict when and how much coverage 322 can be expected by each communication subscriber node as described below.

Use of the communication travel plan generation system 310 addresses three major technical challenges to achieve the capability for inverse planning of mission flight plans. First, the planning solution is capable of dealing with a diverse set of military radios of the communication subscriber nodes. Some of these radios support sophisticated IP networking, while others may support only voice or older, legacy networking capabilities. Second, in embodiments, the planning software is integrated with existing and future mission-planning systems, as well as being able to operate in a stand-alone manner both for testing and as a viable use case. Thirdly, in addition to being able to "pre-plan" missions, the planning solution in an embodiment react in real time during the course of a pre-planned mission to adjust flight geometry and dynamically re-plan based on changes in the battle space.

As discussed above, the communication travel plan generation system 300 can be a standalone package or can be integrated in a mission planning system. By designing in complete input/output isolation, the innovative communication travel plan generation system approach ensures easy integration with present and future planning systems as well as stand-alone operation. Non-limiting examples of a communication travel plan generation system 300 integrated with a mission planning system, such as the joint mission planning system (IMPS), is described in the U.S. Pat. No. 9,685,088, filed Apr. 8, 2016, which is incorporated herein by reference in its entirety. Furthermore, U.S. Pat. No. 9,685,088 also describes how the mission control server can generate various waypoints and guide a mobile vehicle (e.g., aerial vehicle) to provide connectivity to various nodes.

Figure 4:
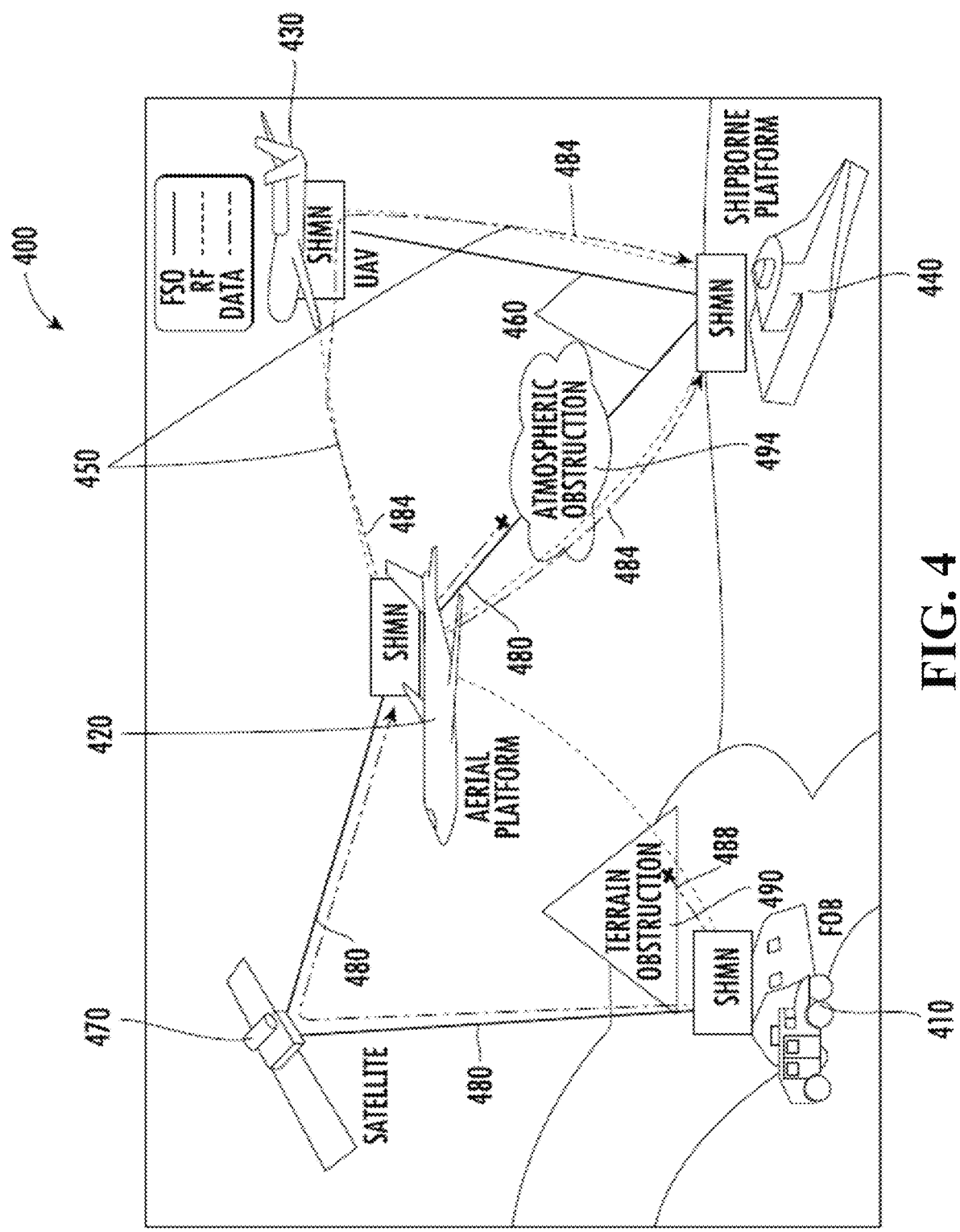
FIG. 4 illustrates communications between aerial communication platforms utilizing the travel plan generation system, in accordance with an embodiment.

Referring now to FIG. 4, an integration solution utilizing the systems and methods described herein is illustrated. Specifically, the integration solution is installed on four aerial network platforms: a forward operating base (FOB) 410, an aerial platform 420, an unmanned aerial vehicle (UAV) platform 430, and a Ship-borne platform 440. As described herein, forward operating base (FOB) 410 is also called a ground station, and Aerial platform 420 is also called an aircraft. Data flow between nodes of the aerial network might occur over high capacity free space optical (FSO) links 460 or lower-bandwidth radio frequency (RF) links 450. An example of high data-rate flow is shown at the FSO communication path (large-dash lines) 480 between FOB 410 and Ship-borne platform 440, and examples of lower bandwidth data flow are shown at the RF communication paths (small-dash lines) 484.

In the embodiment 400, as the aerial platform 420 crosses a terrain obstruction 490, the mission control server automatically redirects the data from the obstructed RF link 488 between FOB 410 and Aerial platform 420 to data flow 480 at the FSO links between FOB 410 and Aerial platform 420 via satellite 470. Forward error correction (FEC) data on both links between the FOB 410 and Aerial platform 420 mitigate the number of packets lost entirely, thus reducing failover effects.

In the scenario 400, the aerial platform 420 has temporarily lost FSO communication 480 with the ship-borne platform 440 due to an atmospheric obstruction 494. As RF links 450 between the two nodes are still connected, the rebalances the traffic to utilize the lower-bandwidth RF links. In an embodiment, FEC data reduce data loss while the mission control server redirects the flow. In an embodiment, the higher data-rate flow 480 is too large for a single RF network link 450, and mission control server rebalances the data between two available RF paths. The available RF paths include data flow 484 at the direct RF link between the aerial platform 420 and ship-borne platform 440, and data flow 484 at the RF link between the aerial platform 420 and Ship-borne platform 440 via the UAV platform 430.

Example: In an exemplary embodiment, an aerial vehicle equipped with the systems and methods described herein is capable of planning measures taken against anticipated enemy actions such as electronic warfare (EW) jamming and signal tracking. An aerial vehicle would, when about to enter a known RF-contested environment, automatically and pre-emptively reroute data over alternate FSO network links.

Figure 5:
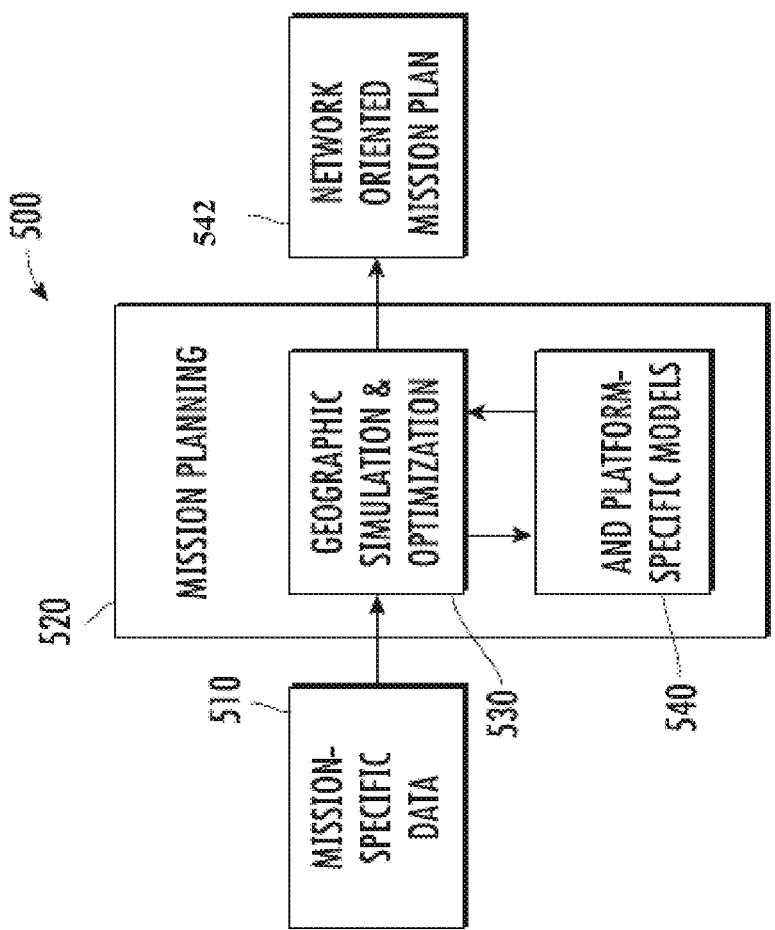
FIG. 5 is a block diagram of a communication travel plan generation system, in accordance with an embodiment.

As shown in the schematic diagram of FIG. 5, mission planning system 500 may generate network-oriented flight plans based on optimizing network mesh connectivity. As described herein, mission planning system 500, is redesigned for predictive load balancing and identifying/utilizing different communications systems. System 500 automatically creates network-oriented flight plans 550 using a mission plan modeling component 520 based on user inputs of mission-specific data 510 to modeling component 520. In various embodiments of modeling module 520, causes the aerial vehicles to dynamically revise to which communications systems they connect.

Based on mission-specific data input 510 to modeling module 520, modeling module 520 performs a geographic search/simulation/optimization 530 of network node locations, flight route paths of aircraft and other platforms, and other geographic factors to develop a network-oriented mission plan 550. In various embodiments, mission-specific data 510 include locations of FSO and Radio subscriber nodes, terrain, weather (e.g., atmospheric conditions and obstructions), and other mission-specific data 510. In an embodiment, mission-specific data for overlay network subscriber nodes includes, e.g., airborne, maritime, and ground-based radio nodes and their configurations, including FSO and RF communications, among others. In an embodiment, geographic search/simulation/optimization 530 defines network node locations and other geographic factors within a battlespace volume. As described herein, the battlespace volume is sometimes called the mission geographic area.

In an embodiment, mission-specific data 510 includes a flight plan/orbit template for flight paths selected by the users. In various embodiments, the flight path template included simple circular orbits of user-selected center position and radius, racetrack, figure-eight, and 6-waypoint orbits. In various embodiments, Geographic Search/Simulation/Optimization 530 determines the characteristic of airborne and surface-based radios in subscriber network nodes at any time throughout the mission geographic area. In various embodiments, Geographic Search/Simulation/Optimization 530 employs a heuristic 3D/4D simulation and optimization algorithm.

The modeling module 520 incorporates behavior models 540 for a diverse set of military radios including FSO and RF communications. In an embodiment, behavioral models for military radios facilitate geographic modeling for a particular pair of military radios via connectivity functions at specified three dimensional locations at a particular time. In an embodiment, modeled characteristics for digital radios included bandwidth, latency, and loss. Modeled characteristics for analog radios included signal strength, gain, and/or S/N ratio. In an embodiment, the mission planning system 500 includes additional FSO-specific coverage parameters, such as minimum duration of connectivity and degradation characteristics. In addition, behavior models 540 include platform-specific behaviors for a variety of aerial communication platforms.

In an embodiment, the mission planning system 500 is configured to output a pre-planned mission plan file 550 including predictive traffic load balancing of FSO communications and other radio communications within the mission geographic area. In an embodiment, in addition to being able to "pre-plan" missions, mission planning system 500 is capable of reacting in real time to updates to the mission-specific data 510 during the course of a pre-planned mission. Mission planning system 500 can output a "re-planned" mission plan file 542 based on changes within the mission geographic area.

In an embodiment, the mission planning system includes multi-radio support, enabling complete analysis of flight-time RF and FSO interactions. That is, the mission server may use sensors (located within the travel area or associated with the nodes within the travel area or the mobile vehicle) to identify networks within the predetermined travel path of the mobile vehicle. In some embodiments, the sensors may include advanced radio technologies including a high capacity backbone (HCB) with network management features.

Mission oriented network visibility presents the network operator with a graphical, geo-mapped picture of the HCB where traffic of interest is automatically tagged with mission relevant labels to provide the operator with improved situational awareness. Mission optimized network operations automatically performs QoS-aware and mission informed load balancing and admission control of network traffic. Mission responsive network control provides system-mediated in-mission reconfiguration of network elements such as radios and routers in response to high-level mission-centric network directives issued by the operator or external network events such as link impairments.

Conventional Air Force mission planning systems require that users manually enter flight paths. To address this limitation, modeling and optimization tool was developed and described in the patent application incorporated herein. The methods and systems described within the incorporated patent, is a software system that can be stand-alone or integrated with existing mission planning systems. Rather than requiring end-users to enter courses, courses can be planned automatically based on where the other mission elements are positioned. This information, along with relative priorities and specifics about radios, allows for more effective planning of courses and placement in airspace of dedicated airborne relays.

In various embodiments, the methods and systems described herein improve overall network connectivity. By leveraging software models of vehicles, communications platforms, terrain, atmospheric, and other conditions, the methods and systems described herein are able to construct network connectivity over the life of a given mission where the network connectivity can periodically be optimized. Unlike more computing-intensive computational models, the methods and systems descried herein may efficiently calculate and revise connection links during the mission. During operation, if mission elements approach a boundary in which a better network connectivity link/mesh is available, the mission control server may redirect traffic over alternative network paths, increasing network connectivity and efficiency.

In some embodiments, dynamic airborne mission communication system installed within the aerial vehicles can be augmented by a dynamic network mesh optimization protocol/software solution. The dynamic network mesh optimization software may provide seamless data exchange across the diverse data links while retaining interoperability with other emerging and legacy data links, even when operating in contested environments. The dynamic network mesh optimization software may maximize manned-unmanned teaming (MUM-T) network coverage by continually re-assessing and optimizing node placement and antenna pointing. The method and systems described herein can be hosted on a wide range of existing and future equipment without any change to the communication hardware of the targeted MUM-T data links. The mission control server may optimize network connectivity by determining where to aim steerable antennas within the JALN to maximize network connectivity.

Figure 6:
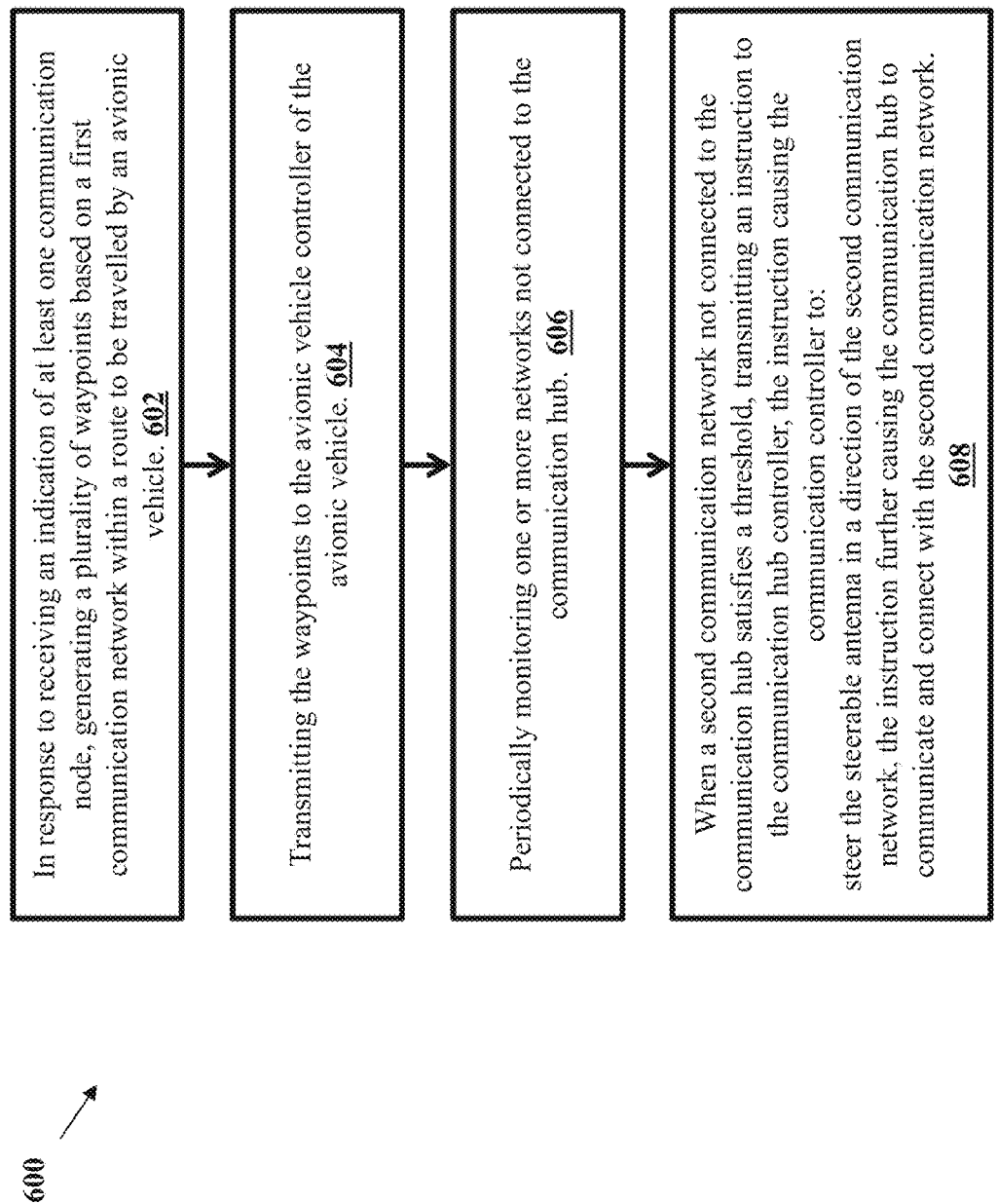
FIG. 6 illustrates a flow diagram of a process executed in a communication optimization system, in accordance with an embodiment.

FIG. 6 illustrates a flow diagram of a process executed in a communication optimization system, according to an embodiment. The method 600 includes steps 602-608. However, other embodiments may include additional or alternative execution steps, or may omit one or more steps (or any part of the steps) altogether. The method 600 is described as being executed by a server, similar to the mission control server described in FIG. 1A. However, one or more steps of method 600 may also be executed by any number of computing devices operating in the distributed computing system described herein.

Even though some aspects of the embodiments described herein are described within the context of proving network connectivity during a mission, it is expressly understood that methods and systems described herein apply to all JALNs and generally to all networks provided using mobile vehicles.

At step 602, the mission control server may, in response to receiving an indication of at least one communication node, generate a plurality of waypoints based on a first communication network within a route to be travelled by an aerial vehicle. The aerial vehicle may include a communication hub configured to communicate with at least one communication node (e.g., CSH or node) within the plurality of communication nodes using a steerable antenna; a communication hub controller configured control movement of the steerable antenna; and an aerial vehicle controller configured control movement of the aerial vehicle.

As described above, a user operating a platform provided by the mission control server may input mission-specific information into the platform. For instance, a user familiar with the mission may input various attributes of the mission into the platform. Mission attributes may include identification of communication nodes awaiting connectivity using a mobile vehicle, e.g., a manned or unmanned aerial vehicle. Mission specific information may also include terrain data identifying geographical attributes associated with the area in which the mission will take place. For instance, a soldier or commander may input mission data into the platform provided by the mission control server.

The mission specific data may include identification of the nodes needing to be connected using a mobile vehicle, sensors within the geographical area of the mission, identification of the geographical area of the mission, such as existence of obstructive conditions (e.g., valleys, mountains, and rivers), elevation information, a number of mobile vehicles configured to provide connectivity to the communication nodes, and the like. The mission control server may then use the methods and systems herein to generate a flight path/orbit including waypoints for the one or more aerial vehicles.

At step 604, the mission control server may transmit the waypoints to the aerial vehicle controller of the aerial vehicle. Using the methods and systems described herein, the mission control server may calculate an optimized flightpath for the mobile vehicle. The mission control server may also calculate specific waypoints along the optimized flightpath. The mission control server may then transmit the waypoints and the flightpath to the mobile vehicle. In some embodiments, the mission control server may transmit the waypoints to a pilot of an aerial vehicle. When the aerial vehicle is an unmanned vehicle, the mission control server may transmit the waypoints to a remote operator (e.g., drone operator) of the unmanned aerial vehicle. In some other embodiments, the mission control server may transmit the waypoints to a software configured to control the unmanned aerial vehicle. As described herein, mission control may continuously monitor various attributes of the mission and may dynamically revise the flightpath accordingly.

At step 606, the mission control server may periodically monitor one or more networks not connected to the communication hub. Throughout the mission (e.g., throughout the flight of the aerial vehicle) the mission control server may periodically (e.g., every five minutes, ten minutes, or any other predetermined and revisable window of time)

monitor one or more networks utilized by the aerial vehicle. For instance, as the aerial vehicle traverses through the waypoints, the aerial vehicle is configured to connect to one or more existing networks/JALNs, thereby providing connectivity to one or more nodes using those networks.

In some configurations, the mission control server may calculate all possible networks along the flight path and transmit instructions to the aerial vehicle before the mission starts. However, as mission conditions may change, the mission control server may identify that connecting to a new network may improve connectivity for the nodes. Therefore, the mission control server may use various sensors (e.g., sensors located within the travel area, sensors implemented or otherwise associated with the communication nodes, and/or sensors implemented or otherwise associated with the aerial vehicle) to monitor other existing networks that could be utilized by the aerial vehicle.

At step 608, the mission control server may, when a second communication network not connected to the communication hub satisfies a threshold, transmitting, by the server, an instruction to the communication hub controller, the instruction causing the communication controller to steer the steerable antenna in a direction of the second communication network, the instruction further causing the communication hub to communicate and connect with the second communication network.

When the mission control server identifies a second network that is not connected to the aerial vehicle, the mission control server may analyze various network attributes of the second network. For instance, the mission control server may identify a throughput value, bandwidth, noise rejection, and/or resiliency value of the second network. When the second network has one or more network attributes that satisfy one or more predetermined thresholds, the mission control may identify the location of the network. For instance, the mission control server may identify a secure network among three previously identified nodes.

In some embodiments, an attribute to be optimized may be selected when entering mission information. For instance, a user may, before the mission starts, instruct the mission control server to perform non-linear optimization protocols and optimize one or more attributes, if possible. That is, the user instructs the mission control server to switch to a new network if the new network has better attributes in a particular category (e.g., throughput or resiliency).

If the identified network has network attributes that satisfy one or more predetermined thresholds, the mission control server may identify the location of the network by identifying the location of the nodes associated with the identified network. In some embodiments, the mission control server may also determine whether the distance between the aerial vehicle and the identified network (or a node associated with the network) satisfies a distance threshold. The mission control server may only proceed if the distance threshold is satisfied (e.g., the node associated with the identified network is closer to the aerial vehicle than the predetermined threshold).

After identifying the location of the second network, the mission control server may transmit an instruction to the aerial vehicle where the instruction causes a steerable radar (or other communication modules of the aerial vehicle) to move towards a direction of the identified network. Therefore, the mission control server may allow the aerial vehicle to dynamically switch from its existing network (initially identified based on mission information received) to a second network that may improve connectivity for one or more nodes by allowing a steerable radar to face the second networks direction. The mission control server may also instruct the aerial vehicle to disconnect from the first/existing network and connect to the second network.

Using the methods and systems described herein, the mission control server can enhance man/unmanned teaming (MUM-T) through network optimization of mobile wireless networks like JALNs. The mission control server may integrate disparate data links using a router of the aerial vehicle, identify JALN optimizations, and push these optimizations to the router in the form of antenna-realignment directives.

The JALN identified and utilized during a mission may include a variety of different network/connectivity protocols (e.g., legacy point-to-point links, such as common data link (CDL) to provide high-capacity, long-range communication capability, other waveforms having LPI/LPD attributes (e.g., multi-link advanced data link or MADL), IP-enabled multiple input and multiple output (MIMO) waveforms (e.g., TRELLISWARE, WAVERELAY, or STREAMCASTER), and/or common commercial off the shelf waveforms like LTE and Wi-Fi). Using the methods and systems described herein the mission control server can reliably continue the data moving between the different users (nodes) who rely on it to complete their missions, even if the users/nodes are utilizing different communication protocols.

When faced with multiple ground subscribers, multiple mountains obstacles, and multiple aircrafts spread over a larger geographical area, and the communication nodes moving throughout the travel path of the aerial vehicle, it is nearly impossible/impractical for a human to provide an optimized connectivity plan. To optimize a large number of variables, the mission control server may user heuristic and non-linear approaches, which are not practical to perform using conventional methods.

In some configurations, radios use the Internet Protocol (IP) to encapsulate data, and data dissemination across JALN networks. In those configurations, transmitting data may be similar to data sharing across the Internet. Due to security reasons, however, in some configurations, JALNs may incorporate non-IP data links. Non-IP communication protocols are more ubiquitous in military JALNs because they are deployed in many existing weapons platforms (e.g., legacy systems).

The non-IP data links were designed to work reliably across a variety of challenging conditions and were highly tuned for tactical use. A non-limiting example of a non-IP data link may include Link-16 radios, which weren't developed as a general-purpose data transport, but rather as a vertically integrated wireless communication channel on which aircraft, radars, missile batteries, ships, and ground vehicles can inject and consume situational-awareness information in the form well-defined 80-bit messages that describe the tactical theater as a set of tracks that identify friendly and hostile objects that have been detected by platform sensors (like radars) that also participate in the Link-16 network.

Link-16 is an example of a legacy data link that would be impractical to discard. Link-16 is associated with a higher line-of-site transmission range, bounded data delivery time because of its TDMA architecture, and may be resistant to jamming. In contrast, the Link-16 terminals may be expensive, difficult to configure, and may have no provisions for self-configuration, self-healing, or scalability.

Similar limitations may also exist for waveforms that do support IP packetization, notably CDL, army network (ANW2), soldier radio waveform (SRW), and tactical targeting network technology (TTNT). For instance, ANW2 and SRW may require a definition of the number of nodes that can in the resultant mobile ad-hoc network (MANET). Moreover, the above-referenced waveforms confound the creation of tactical networks comprised of different waveforms either because of their flawed multicast implementations (SRW/ANW2) or suppression of dynamic routing protocol packets that were not organically generated (TTNT).

The above-described inadequacies are detrimental for manned-unmanned interoperations in a highly contested area that requires autonomous deployment of a flying wireless mesh network using UAVs networked with manned aircraft.

The methods and systems described herein are able to utilize diverse, IP-enabled waveforms, including ANW2, CDL, ROVER/VORTEX, SRW, and TTNT and other non-IP-enabled communication protocols to create seamless data exchange across JALNs.

Figure 7:
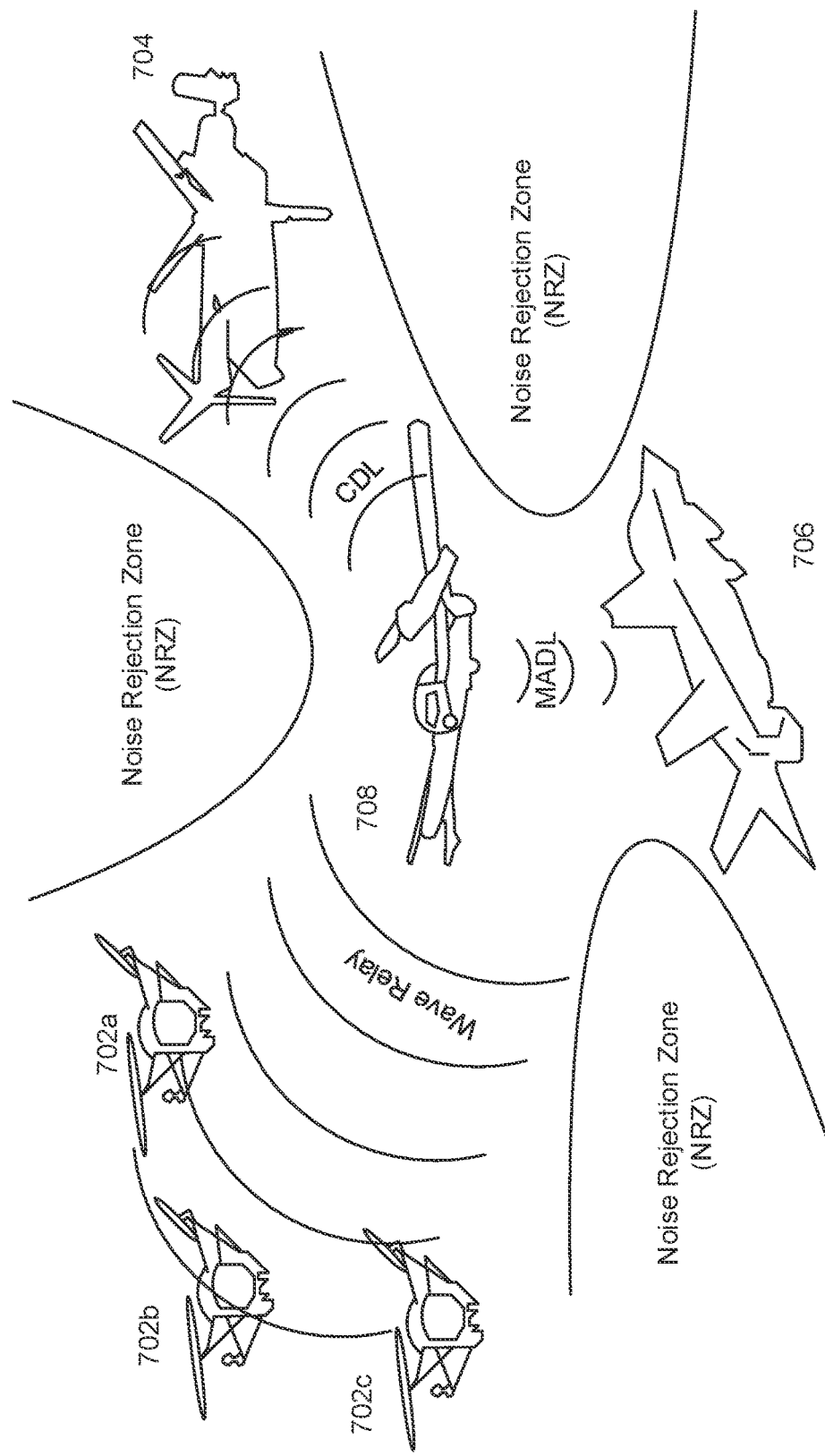
FIG. 7 illustrates a non-limiting example of the operations of a communication travel plan generation system, in accordance with an embodiment.

In the embodiment depicted in FIG. 7, an unmanned aerial vehicle (UAV) 708 flies throughout a predetermined region to bring connectivity to different nodes depicted in this figure (e.g., drone 702*a*-*c*, node 704, and node 706). The UAV 708 is equipped with three different radios onboard: WaveRelay, common datalink (CDL), and multifunction advanced datalink (MADL). Each radio communication protocol may have its own steerable antenna. The steerable antenna allows the UAV 708 to provide connectivity to the nodes.

The steerable antenna may be aimed at different nodes configured to use different radio communication technology. For instance, the UAV 708 is configured to aim the WaveRelay antenna at drones 702*a*-*c*, the CDL antenna towards the aircraft/node 704, and the MADL antenna towards the aircraft 706. The UAV 708 may use the method in this and systems described above to initially align each antenna towards different nodes depicted in FIG. 7.

Multi-beam CDL systems/radars and, in some embodiments, the classified MADL waveform may use one of their channels to constantly scan for RF energy in order to discover neighbors that appear within their range. However, WaveRelay systems/radars may not have a scan-to-discover-neighbors feature for their tracking antenna systems. Instead, the WaverRelay systems/radars may have an initialization procedure for tracking antennas where the tracking antenna is manually pointed in a particular direction until a radar lock with a remote neighbor is attained. After the signal lock has been established, the remote neighbor may transmit (e.g., push) its GPS coordinates to the tracking antenna, and the tracking antenna may track the remote neighbor. CDL radios and tracking antennas may employ a similar approach to tracking.

Conventional ad-hoc routing protocols made design decisions based on the assumption that a specific node's mobility pattern could not be predicted. Nodes were assumed to move according to their own protocols and flight plans. Therefore it would've been the network providers' responsibility to find a path, if one existed between two nodes. This assumption, however, has been revised by the methods and systems described herein. The placement of JALN nodes, especially the airborne assets, and their movement patterns during a mission, may be very well understood by the mission planners who have developed the airborne assets' flight paths.

Rather than having mission-planners manually enter specific waypoint and course information, the method and systems described herein plan flight paths automatically based on information about where the ground, maritime, and air-based mission elements are/will be positioned. This information, along with relative priorities and specifics about radio parameters and the flight capabilities of the platform allows for the mission control server to implement much more effective planning of courses and placement in airspace of these new airborne relays.

The mission control server may construct a three-dimensional (3D) model of all the mission elements over time (including terrain and other factors). The mission control server may then use advanced optimization techniques to search through hundreds or thousands of possible flight paths to find the best flight path. The 3D model can include factors such as antenna shading (due to aircraft banking) or the propagation characteristics of the waveforms and frequencies.

The mission control server may optimize flight paths for a specific objective function. Conventionally, the mission objective function has been maximization of coverage for ground subscribers to an aerial communication relay. However, the mission control server's objective may also be defined to maximize JALN performance given steerable antennas and multi-beam radios. The JALN performance metrics built into the objective functions(s) could include throughput, network diameter, resiliency (elimination of single-points of failure in the JALN), noise rejection, or satellite communication (SATCOM) avoidance.

Figure 8A:
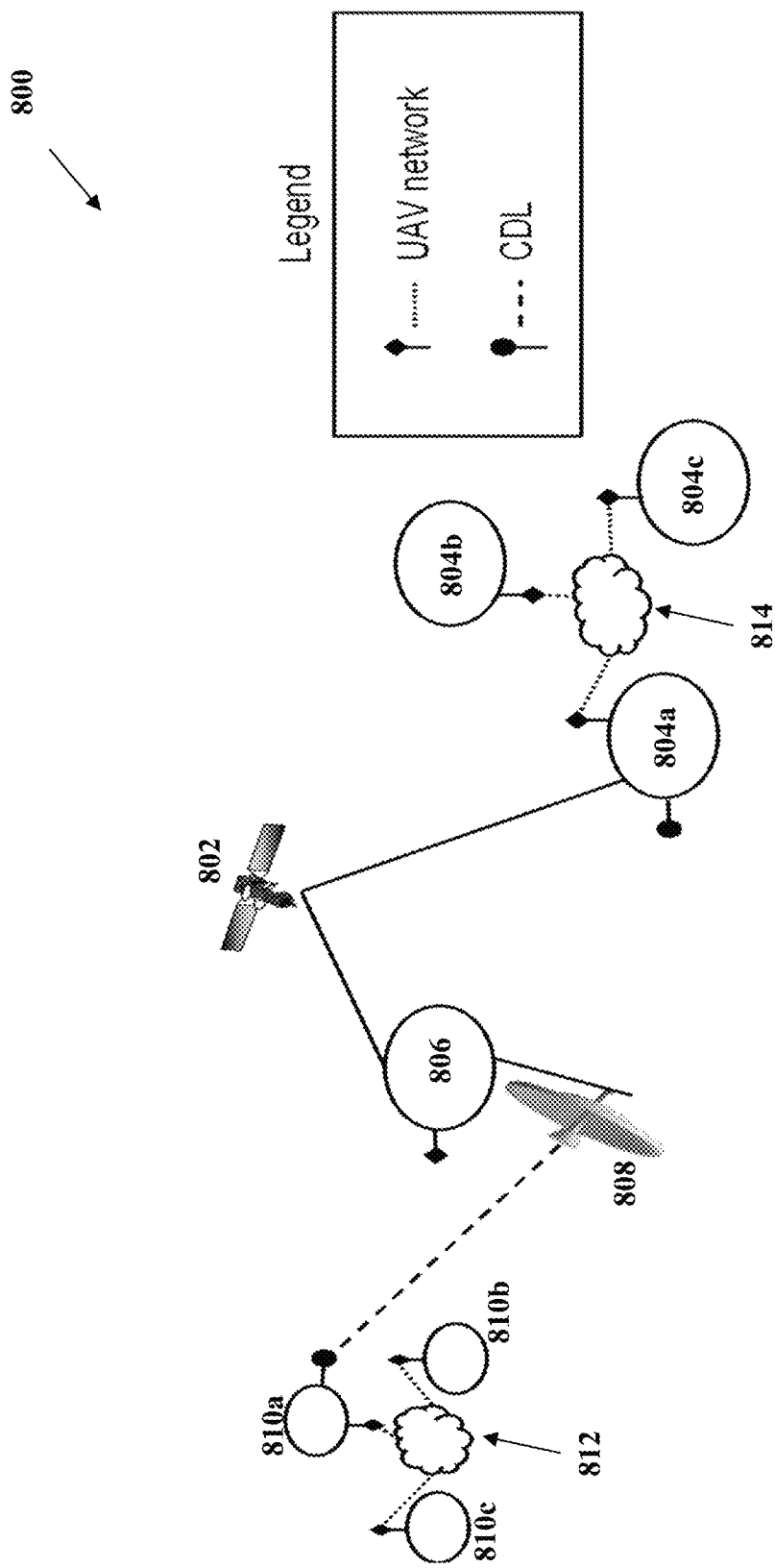
FIGS. 8A-B illustrate non-limiting examples of the operations of a communication travel plan generation system, in accordance with an embodiment.
Figure 8B:
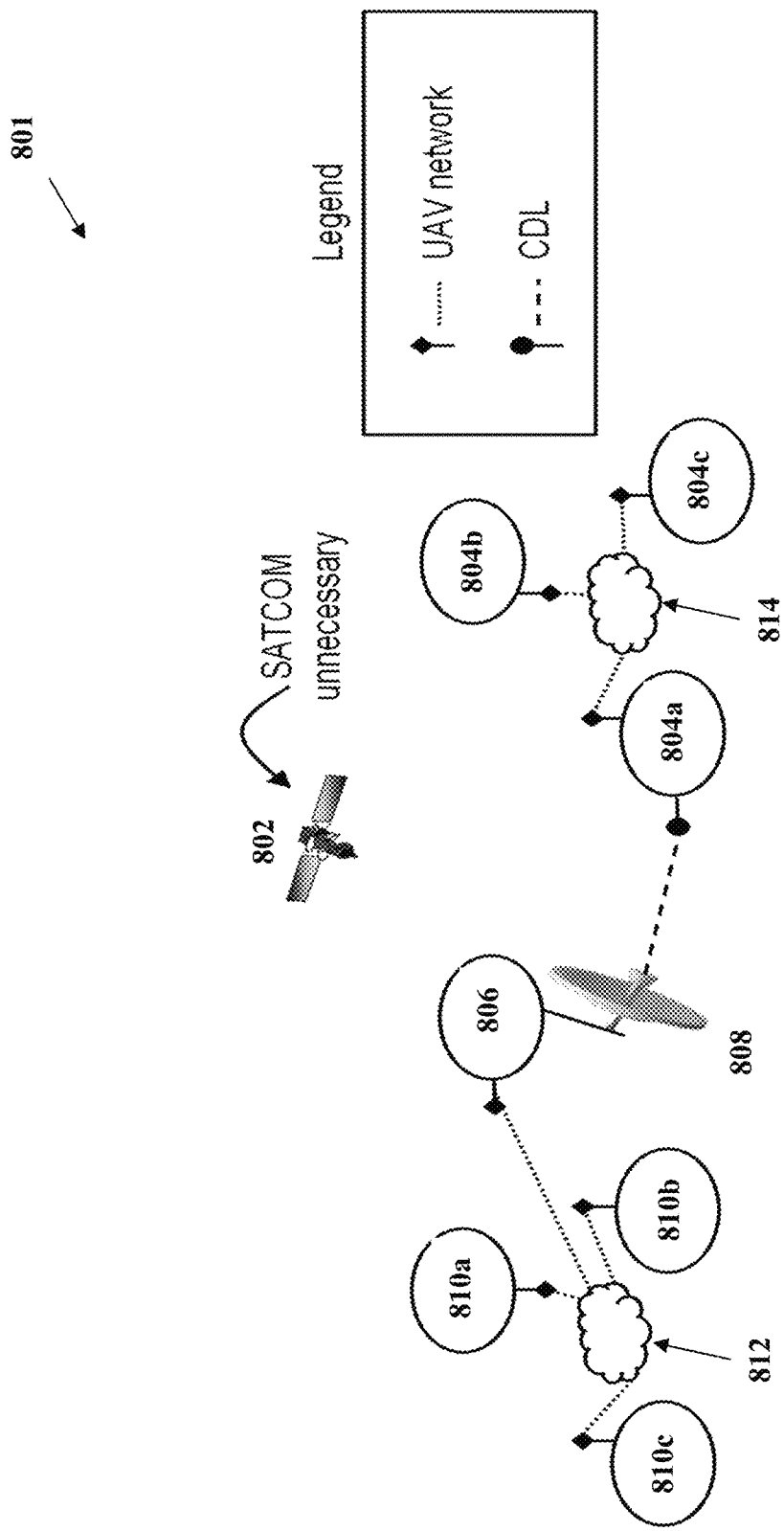

Referring now to FIGS. 8A-B, and non-limiting example of the methods and systems is illustrated. As depicted, JALN 800 includes a UAV 806 having a steerable antenna 808 that allows network connectivity to nodes 810*a*-*c* and 804*a*-*c*. UAV 806 provides UAV network 812 that includes nodes 810*a*-*c* and UAV network 814 that includes nodes 804*a*-*c*. Nodes 810*a* and 804*a* each have a wireless radio and omnidirectional antenna where these nodes can communicate with the UAV 806 and provide each respective UAV network 812 and 814. Nodes 810*a* and 804*a* may have a single-channel CDL radio with an omnidirectional antenna. UAV 806 and node 804*a* may each have a low-bandwidth SATCOM radio for beyond-line-of-sight (BLOS) communications. UAV 806 may use the steerable antenna 808 for its single-channel CDL radio.

In the depicted embodiment, UAV networks 812 and 814 may have relatively high data throughput rates, but relatively short maximum transmission ranges due to low-power amplifiers and omnidirectional antennas (as is the case for modern multiple input and multiple output (MIMOs), such as TSM-X, WAVERELAY, and SILVUS STREAMCASTER communication protocols). UAV 806 and/or the mission control server may identify that the UAV network 812 is beyond the range of UAV 806's UAV-network radio. Therefore, mission control sever may instruct the UAV 806 to use the steerable antenna 808 to connect to UAV network 814. The mission control server may determine that the UAV 806 and the node 804*a* are within CDL range of one another, but only if the steerable antenna 808 is pointed towards the node 804*a*. This reconfiguration may cause the loss of connectivity to the UAV network 812. As a result, data exchange between the two UAV networks 812 and 814 occurs over the SATCOM link 802.

Utilizing the SATCOM line 802, however, is not a desired method of communication. UAV 806's router may pass data packets across the different JALN waveforms. Because SATCOM link 802 is costly, resource intensive, and not efficient, UAV 806's router may be forced to prioritized data across the low-bandwidth SATCOM link 802. For instance, if the SATCOM link 802 lacked the capacity to move a full-motion-video stream, the UAV 806's router may halt the data traffic in order to preserve the ability to continue to pass navigation and UAV control data.

The mission control server may rectify the above-described problem by utilizing the methods and systems described herein, the mission control server may instruct the steerable antenna 808 to connect to different nodes (e.g., physically move towards the direction of different nodes) based on a change in the JALN topology. FIG. 8B illustrates JALN 801. Specifically, the mission control server modifies the JALN 800 into the JALN 801 to increase connectivity efficiencies. When the UAV 806 moves in a position closer to node 804*a* (e.g., close enough that node 804*a* could directly join the UAV network 812 without the intermediate hop across CDL link between UAV 806 and node 810*a*), the mission control server may instruct the steerable antenna The mission control server may transmit an instruction to the steerable antenna that identifies a direction of the node 804*a* and instructs the steerable antenna 808 to face the identified direction. In some embodiments, the steerable antenna 808 may be equipped with re-routing capabilities (e.g., self-healing, intelligent route selection technology). When the UAV 806 connects to node 804*a*, the SATCOM link 802 could be avoided altogether for the JALN 800/801. Avoiding the SATCOM line 802 increases overall JALN throughput.

The mission control server may periodically monitor the location of the steerable antenna (UAV 806) and the nodes using sensors described herein. Therefore, the mission control server may consider the pre-mission plan for each node or its respective mobility (and resultant JALN topology, which indicates the actual node-location information. The mission control server may transmit a notification onto an electronic device of the UAV 806, such that the notification displays a three-dimensional rendering of the target location and the direction to which the steerable antenna 808 must face. The notification may also include an interactive element, whereby an operator of the UAV 806 may accept and/or deny repositioning of the steerable antenna 808 in accordance with the network topology. In effect, mission control server's actions may represent initial steps towards providing cognitive-network capabilities for JALNs (and other tactical networks) that are formed from legacy data links without requiring changes to legacy radio equipment.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An electronic system for an aerial vehicle configured to connect a plurality of communication nodes, the electronic system comprising:
   a communication hub configured to communicate with at least one communication node within the plurality of communication nodes using a steerable antenna; and
   a communication hub controller configured control one or more movement attributes of the steerable antenna;
   an aerial vehicle controller configured control one or more movement attributes of the aerial vehicle; and
   a server in communication with the aerial vehicle, the server configured to:
      in response to receiving an indication of at least one communication node, generate a plurality of waypoints based on a first communication network within a route to be travelled by the aerial vehicle;
      transmit the waypoints to the aerial vehicle controller;
      periodically monitor one or more networks not connected to the communication hub;
      when a second communication network not connected to the communication hub satisfies a threshold, transmit an instruction to the communication hub controller, the instruction causing the communication controller to steer the steerable antenna in a direction of the second communication network, the instruction further causing the communication hub to communicate and connect with the second communication network.

2. The electronic system of claim 1, wherein the communication hub connects one or more communication nodes using the second communication network.

3. The electronic system of claim 1, wherein the threshold corresponds to a connectivity attribute of the second communication network.

4. The electronic system of claim 3, wherein connectivity attribute of the second communication network corresponds to at least one of a throughput, bandwidth, noise rejection, and resiliency of the second communication network.

5. The electronic system of claim 1, where the electronic system further comprises:
   one or more sensors configured to identify a location of the one or more communication nodes.

6. The electronic system of claim 3, wherein the threshold corresponds to a distance between the one or more communication nodes with the aerial vehicle.

7. The electronic system of claim 3, wherein the threshold corresponds to a distance between the aerial vehicle and a communication node associated with the second communication network.

8. The electronic system of claim 1, wherein the server is further configured to:
   instruct the communication hub to disconnect from the first communication network.

9. The electronic system of claim 1, wherein the first communication network is a satellite communication network.

10. The electronic system of claim 1, wherein the aerial vehicle is an unmanned vehicle controlled via a user remotely operating the aerial vehicle controller.

11. A method comprising:
   in response to receiving an indication of at least one communication node, generating, by a server, a plurality of waypoints based on a first communication network within a route to be travelled by an aerial vehicle, the aerial vehicle comprising:
      a communication hub configured to communicate with at least one communication node within the plurality of communication nodes using a steerable antenna; and
      a communication hub controller configured control movement of the steerable antenna; and
      an aerial vehicle controller configured control movement of the aerial vehicle;
   transmitting, by the server, the waypoints to the aerial vehicle controller of the aerial vehicle;
   periodically monitoring, by the server, one or more networks not connected to the communication hub;
   when a second communication network not connected to the communication hub satisfies a threshold, transmitting, by the server, an instruction to the communication hub controller, the instruction causing the communication controller to:
   steer the steerable antenna in a direction of the second communication network, the instruction further causing the communication hub to communicate and connect with the second communication network.

12. The method of claim 11, wherein the communication hub connect one or more communication nodes using the second communication network.

13. The method of claim 11, wherein the threshold corresponds to a connectivity attribute of the second communication network.

14. The method of claim 13, wherein connectivity attribute of the second communication network corresponds to at least one of a throughput and bandwidth of the second communication network.

15. The method of claim 11, where the electronic system further comprises: one or more sensors configured to identify a location of the one or more communication nodes.

16. The method of claim 13, wherein the threshold corresponds to a distance between the one or more communication nodes with the aerial vehicle.

17. The method of claim 13, wherein the threshold corresponds to a distance between the aerial vehicle and a communication node associated with the second communication network.

18. The method of claim 11, wherein the server is further configured to: instruct the communication hub to disconnect from the first communication network.

19. The method of claim 11, wherein the first communication network is a satellite communication network.

20. The method of claim 11, wherein the aerial vehicle is an unmanned vehicle controlled via a user remotely operating the aerial vehicle controller.

* * * * *